May 9, 1939. K. K. PROBST 2,157,773
VEHICLE CONSTRUCTION
Filed April 16, 1934 4 Sheets-Sheet 3
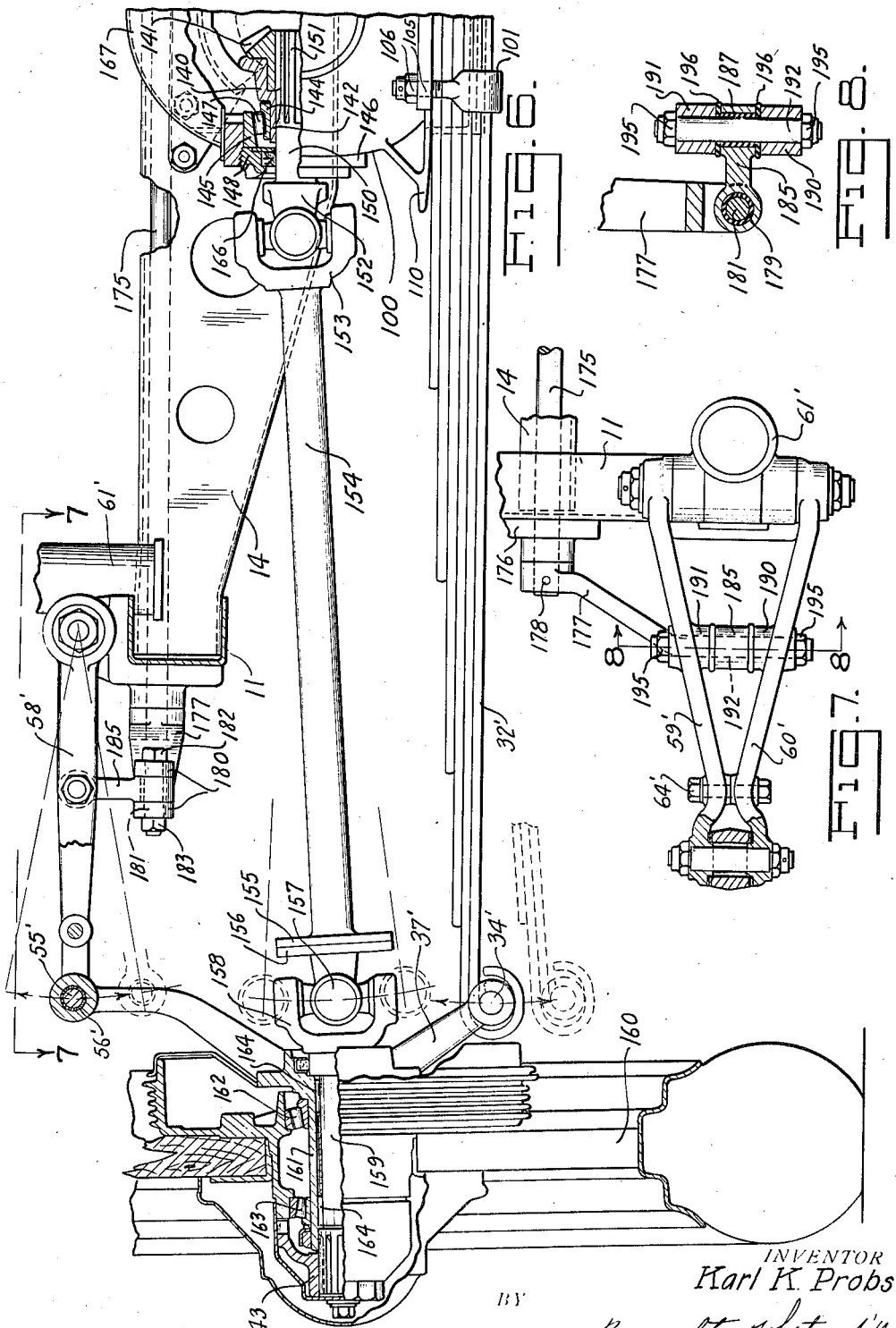
INVENTOR
Karl K. Probst
ATTORNEY

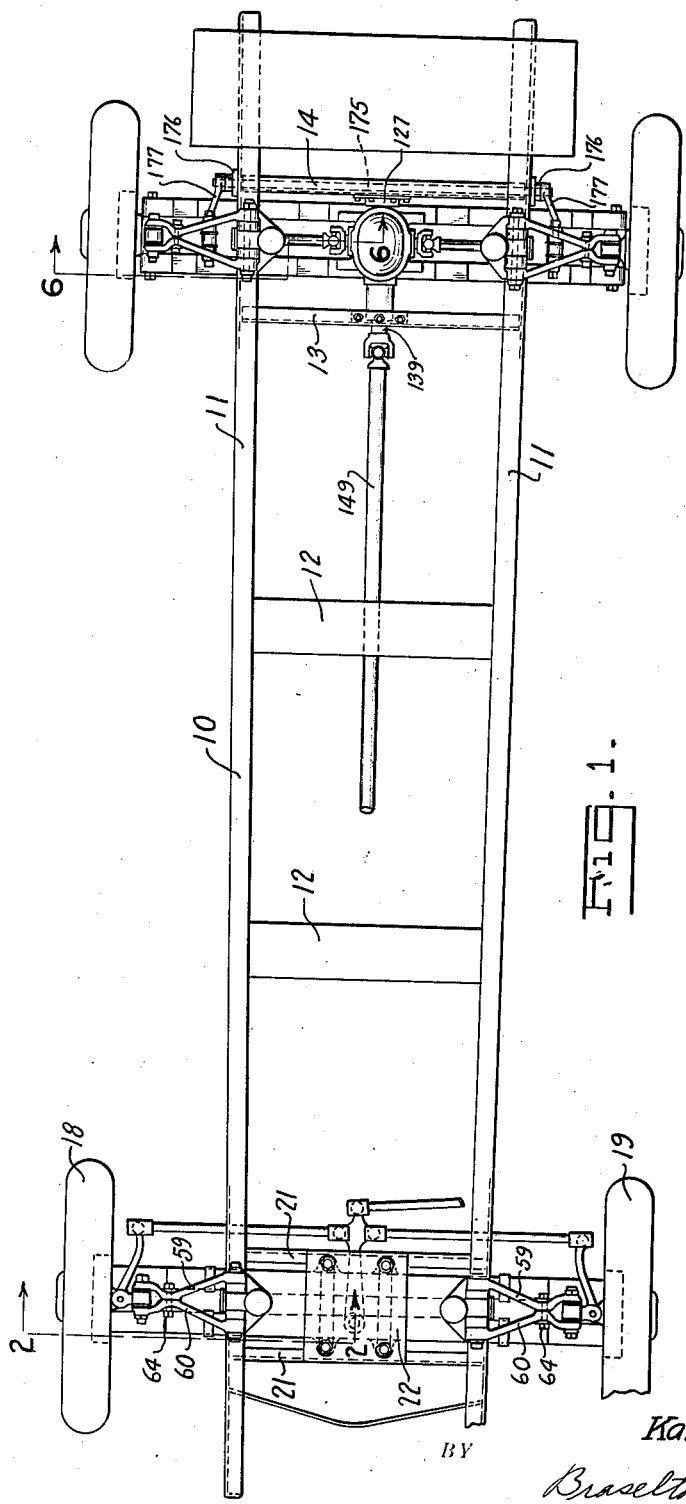

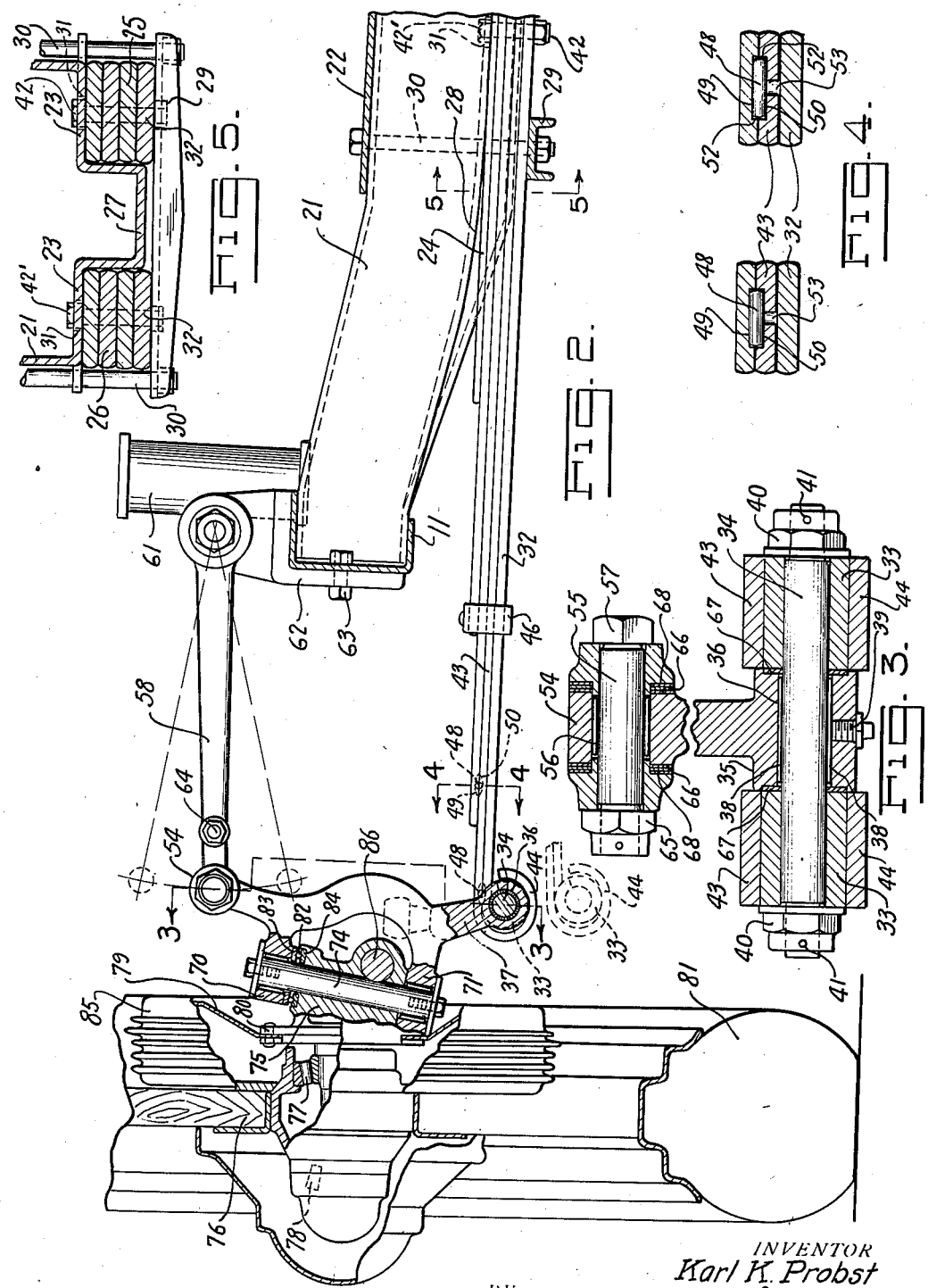

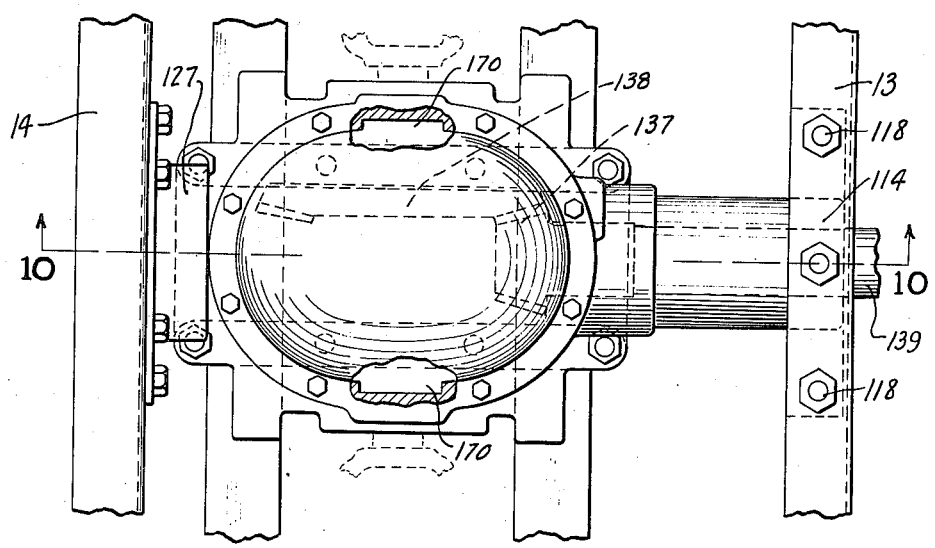

Patented May 9, 1939

2,157,773

UNITED STATES PATENT OFFICE 2,157,773

VEHICLE CONSTRUCTION

Karl K. Probst, Toledo, Ohio

Application April 16, 1934, Serial No. 720,755

8 Claims. (Cl. 180—73)

This invention relates to vehicle construction, more particularly to the suspension of wheels from a vehicle frame to facilitate vertical movement of a wheel independently of the remaining wheels.

An object of the invention is the provision of a novel means of mounting or suspending a vehicle wheel independent of the other wheels eliminating the rigid axle or "bridge" member.

The invention contemplates the utilization of so-called flat or leaf spring assemblies forming a part of a vehicle wheel mounting unit, yet of a nature which will permit the movement of one wheel independently of the other wheels of the vehicle.

The invention embraces the provision of a resilient means for connecting a wheel to a vehicle frame incorporating as a part of the arrangement a shock absorbing means in conjunction with linkage connected to the vehicle wheel mounting of a character which permits ready vertical movement of a wheel with little or no lateral or "scuffing" movement of the tire upon the ground.

Another object of the invention is the provision of a mounting for vehicle wheels utilizing flat or leaf springs wherein the arrangement coupled with coordinating linkage is ample to withstand driving and braking torque reaction.

Another object of the invention is the provision of a wheel mounting which facilitates the incorporation of a simple yet efficient driving connection between the vehicle drive wheel or wheels and the engine or prime mover, yet permitting vertical independent movement of the wheels. The invention embraces the provision of a driving means for independently mounted vehicle wheels wherein any relative longitudinal movement of the driving means resulting from vertical movement of the vehicle wheels takes place within an enclosed driving unit which is at all times efficiently lubricated.

A further object of the invention is the provision of a driving connection of a character wherein the differential and power transmission mechanism are contained within a housing preferably arranged centrally of the vehicle, and which is resiliently or yieldably supported upon the frame thus eliminating the transmission of the engine vibrations gear resonance or noises to the vehicle frame. The invention embraces the provision of a power transmission arrangement for use in a vehicle of this character wherein the assembly of the differential gearing and gear mechanism for actuating the drive wheels may be easily and readily assembled.

Still a further object of the invention is the provision of a simple and effective means for aligning the several component parts of a spring construction of a character which is capable of withstanding severe lateral torque which may result from road shocks or driving and braking reactions.

A further object is the provision of a simple and effective driving and power transmission means for propelling an automotive vehicle and the method of assembly whereby the parts are maintained in positive driving relationship and which may be readily dismantled for purposes of replacement and repair.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a top plan view of a vehicle, especially showing the frame construction and the arrangement of independent wheel suspension and vehicle driving mechanism of my invention;

Figure 2 is an enlarged detail sectional view showing the mounting of one of the front or non-drive wheels of the vehicle showing a form of wheel suspension of my invention, the section being taken substantially on the line 2—2 of Figure 1;

Figure 3 is an enlarged detail vertical sectional view taken substantially on the line 3—3 of Figure 2;

Figure 4 is a vertical transverse sectional view taken substantially on the line 4—4 of Figure 2;

Figure 5 is a transverse, vertical, sectional view taken substantially on the line 5—5 of Figure 2;

Figure 6 is a view taken substantially on the line 6—6 of Figure 1 showing a form of suspension and driving mechanism for one of the rear or drive wheels of the vehicle;

Figure 7 is a top plan view, partly in section, taken in the direction of line 7—7 of Figure 6;

Figure 8 is a sectional detail view taken substantially on the line 8—8 of Figure 7 showing one of the link connections forming part of the invention;

Figure 9 is a fragmentary top plan view of the differential and drive gear housing and supporting means therefor forming a part of my invention;

Figure 10 is a longitudinal, vertical, sectional view through the differential housing shown in Figure 9, the section being taken substantially on the line 10—10 of Figure 9;

Figure 11 is a detail vertical sectional view taken substantially on the line 11—11 of Figure 10 showing a method of and arrangement of mounting the differential and drive gear housing;

Figure 12 is a transverse vertical sectional view through a portion of the rear axle housing illustrating the method of assembling the driving gear and differential mechanism.

While I have shown in the accompanying drawings a preferred form of the invention in issue, I do not wish it to be understood as limited to the details of construction as illustrated, but that I contemplate various modifications and uses and particularly of the driving mechanism which is capable of application and conjoint use with other mechanisms.

Referring to the drawings in detail, 10 illustrates a frame construction of an automotive vehicle which in the embodiment illustrated consists of side members 11 and several cross-members 12, 13, 14 and 21 connecting side members 11 together, these parts being preferably of channel formation although it is to be understood that any type of vehicle or frame construction may be utilized. In the arrangement illustrated, the non-drive wheels are the front wheels but it is to be understood that the particular wheel suspension arrangement of my invention is susceptible for use with constructions employing several non-drive wheels as, for example, trailers or the like or with four or multiple wheel drive constructions without departing from the scope of the invention.

The mounting or suspension of the front wheels 18 and 19 are substantially identical as particularly exemplified in Figures 1 and 2 and therefore a detailed description of one mounting is hereinafter set forth. The channel members 11 of the frame 10 are joined together at the forward portion by cross member 21 above the central portion of which is positioned a plate 22. The cross member 21 is provided with a configuration in cross-section, as illustrated in Figure 5, having two horizontal portions 23 forming spring seats to accommodate the parallel spring assemblies 25 and 26, and a depressed portion 27 which extends between and serves to separate and position the spring assemblies. Arranged beneath the portion 27 of the cross-member 21 and the lower leaves of the spring assemblies are transverse channel shaped members 29 which are connected by bolts 30 to plate 22 or other portion of the vehicle frame, the members 29 serving to hold the spring assemblies 25 and 26 in proper position upon the seats 23 of the cross member 21. The lowermost leaves 32 of the spring assemblies are wrapped or curled at their ends into substantially cylindrical configuration as at 33 to receive a shackle bolt or pin 34 which also extends through a bore 36 in a boss 35 formed on the lower extremity of an arm 37. While plain bearings may be employed, I have found it desirable to use anti-friction bearing means between the arm 37 and the shackle bolt 34 and in the form of the invention illustrated I have interposed a plurality of needles 38 forming a needle or anti-friction bearing. As shown in Figure 3, this bearing may be lubricated through an opening in the wall of the boss 35 normally closed by means of a threaded plug 39. The shackle bolt 34 is preferably threaded at each end to receive nuts 40 which may be locked in place by means of cotter keys 41. I have found it desirable primarily as a safety factor, although not absolutely essential, to project the next to the lowermost leaf 43 in each spring assembly over the extremity of leaf 32 and curl or form the ends of leaves 43 around the external cylindrical formation 33 of the lowermost leaf, this arrangement being particularly shown as at 44 in Figures 2 and 3, the curled portion being substantially of oval configuration to accommodate the sliding movement between the spring leaves during flexure. In this manner, considerable strength is added of value in the absorption of braking torque re-actions, road shocks and the like. Spring clips 46 may surround several of the leaves of each spring assembly, as particularly shown in Figure 2, in order to maintain alignment of the spring leaves. In order to enhance the riding qualities of the vehicle, I have incorporated means for decreasing the friction between certain leaves of the spring assembly, particularly at points where considerable sliding or relative movement of the leaves takes place. In the embodiment illustrated, this means comprises short pins or rollers 48 as particularly shown in Figures 2 and 4, these rollers being positioned in transverse slots 49 and 50 machined or otherwise formed in adjacent leaves of the spring assembly. The slots are preferably of oval configuration as shown in dotted lines in Figure 2 so that during relative longitudinal sliding motion of one spring leaf upon another, the rollers 48 may rotate and thus decrease the co-efficient of friction between leaves. It is desirable that the rollers be of a diameter of slightly greater dimension than the combined depth of adjacent or mating slots in the spring leaves in order to hold the inner juxtaposed surfaces of the leaves slightly apart so that the rollers 48 will function as an anti-friction bearing means between the adjacent leaves. I have shown the rollers 48 as interposed between the two lowermost leaves and the intermediate and third leaf of each spring assembly near the ends of the leaves as the greater relative sliding action between the leaves of the spring is encountered at these points. The rollers 48 are preferably made slightly convex on the ends as shown at 52 and are allowed slight end play of the slots 49 and 50 and in this way the rollers 48 perform the functions of preventing excessive lateral movement of the spring leaves and especially is this desirable by reason of the braking torque or reaction which may tend to cause relative transverse sliding movement of the spring leaves. As illustrated in Figure 4 in the spring leaf incorporating the slots 50, it is desirable to have openings 53 communicating with the slots for purposes of retaining lubricant and for receiving accumulations of dust or other foreign matter which may enter the slots 49 and 50.

Arm 37 is formed adjacent its upper portion with a boss 54 which is bored to accommodate a transversely extending pin 55. I have found it preferable to interpose needle bearings 56 or other anti-friction bearing means between the pin 55 and the inner walls of the bore in the boss 54, although plain bearings may be used if desired.

A link construction 58 in the embodiment shown comprising an assembly of two arms 59 and 60 serve to connect the arm 37 to a suitable shock absorbing means 61, the latter being preferably supported by the frame 11 through the medium of a bracket 62 as particularly disclosed in Figure 2, the bracket being secured to the frame by means of bolts 63. The shock absorbing means 61 is preferably of the hydraulic type of conventional design. The arms 59 and 60 are secured together intermediate their ends by means of bolt 64 or other suitable means, the outer ends of the arms of the link construction being bored to snugly fit the pin 55.

The bearing pin 55 has an enlarged head portion 57 on one end and is preferably threaded to accommodate a retaining nut 65 on the other end to hold the arms 59 and 60 in assembled relation.

In order to minimize wear caused by braking torque and road shock thrusts and eliminate squeaks, it is desirable to interpose between the arms 59 and 60 and the end walls of boss 54 of arm 37 thrust washers 66 which may be of a material capable of withstanding thrusts as, for example, graphite bronze, or the like, and other shims or washers 68 which may be of steel or suitable material.

This arrangement provides for a simple, yet effective, adjustment of the angle of inclination of the king pin 74. If it is desired to change this inclination, it is only necessary to remove the nut 65, separate the arms 59 and 60 a sufficient distance to permit removal of one or more of the washers or shims 68 from one side which may be transferred to the other side and in this manner the king pin inclination may be varied, for example, by placing two of the washers 68 on one side and four washers on the other, the king pin inclination is thus changed over its original position. It is to be understood that any number of washers may be used dependent upon the range of adjustment desired.

It may also be found desirable to interpose washers of this character as shown at 67 between the end walls of the lower portion of arm 37 and the curled end portions 33 of lowermost spring leaves 32, these arrangements being particularly shown in Figure 3 of the drawings.

Arm 37 is provided with spaced projecting boss portions 70 and 71 which are bored to receive needle bearings or other suitable bearing means, the bores and bearings being properly aligned to accommodate a king pin 74. Positioned between the boss portions 70 and 71 is a wheel supporting member or spindle 75 which carries a vehicle wheel 76 and tire 81 of conventional design on suitable bearings 77 and 78, these bearings preferably being of the tapered roller construction so as to withstand lateral as well as vertical thrusts. The spindle construction 75 is also arranged to carry the internal relatively stationary mechanism of the wheel braking arrangement, a member 79 being fixed to a flange 80 of the spindle, the member 79 being arranged to carry suitable brake shoes of the conventional design (not shown) arranged for cooperation with the brake drum 85 mounted upon the wheel 76. If desired, an anti-friction bearing in the form of a ball bearing 82 may be interposed between thrust washers 83 and 84 arranged adjacent boss 70 to reduce the friction between the parts arising by reason of the vehicle load.

The wheel spindle construction 75 is formed with a transverse bore adapted to accommodate a steering arm 86 which is suitably connected by means of tie rods and links (not shown) to the usual steering wheel.

In the arrangement illustrated, the portion of the spring support 21 engageable with the uppermost leaves 24 of the spring assemblies is progressively curved away from the central supporting point of the spring as at 28 which forms a particularly advantageous function. I contemplate the utilization in the arrangement of comparatively soft, highly flexible leaf springs so as to enhance the riding qualities of the vehicle, yet, it is desirable that when the wheel strikes an obstruction that an arrangement be provided whereby the resistance of the movement of the wheel will increase as the wheel is moved upwardly. The curved spring support 28 performs this function, as the spring leaves move upwardly the actual effective spring support or fulcrum is shifted outwardly by reason of different point of contact of the leaf 24 with the curve of the portion 28 thus effectively stiffening the spring. This effective shifting of the spring support or fulcrum gives a progressive spring action which permits the use of a spring of softer material and greater flexibility giving it an easier ride under normal conditions or conditions where road irregularities are minor which is not attainable with a stiffer spring. A spring of this character is capable of a greater degree of flexibility and at the same time the period of oscillation of the spring is considerably decreased. This progressive spring action I have found enables the use of a flexible spring and when the vehicle is heavily loaded, the springs deflect to shift the effective support of the spring and virtually shorten the effective spring length under heavy loads or road shocks. Thus, by this construction, the clearances for the drive shafts at the rear wheels and the like may be decreased and thus lower the center of gravity of the vehicle without sacrificing any of the easy riding qualities of a soft spring. The hydraulic shock absorbers 61 serve to check the severity of road shocks and also to dampen the rebound action of the vehicle wheels.

Through the arrangement above described it will be seen that each front wheel of the vehicle is independently suspended and capable of spring action independent of other wheels of the vehicle, and through such a construction one wheel of the vehicle is substantially unaffected by shocks received by another wheel so that the tendency of the front wheels of the vehicle to "shimmy" or vibrate is substantially eliminated.

In the embodiment of the invention illustrated, the drive or rear wheels are also suspended or supported for movement independent of the other wheels much in the same manner as above described. The spring assemblies supporting the drive wheels have the several leaves centrally supported upon a differential casing or housing 100 by means of U-shaped members or clamps 101 as particularly illustrated in Figures 6 and 10. The lower portion of the casing 100 is formed with two right angle bracket portions 102 and 103 which form supports or seats for spring assemblies, a central portion of the housing depending as at 104 forming a means for separating and retaining the spring leaf assemblies in substantially parallel relationship. The ends of the spring clamps 101 are preferably threaded and are received in openings in bosses 105 arranged exteriorly of the casing 100, the threaded ends of the spring clamps 101 receiving retaining nuts 106.

As a further means for securing these springs in position the housing 100 may be formed with interiorly positioned bosses 107 which are bored and threaded to receive cap screws 108 or other retaining means. By this arrangement the spring leaf assemblies are fixedly secured to the differential casing. The lower leaf 32' of each of the rear spring assemblies surrounds a shackle pin or bolt 34' preferably with needle bearing interposed therebetween, in the same manner as described in connection with the arrangement shown in Figure 2 of the front wheels, whereby the springs are pivotally connected to a depending portion of a wheel supporting arm or spindle 37'. The upper extremity of the arm 37' is also bored to accommodate a pivot pin 55' preferably journalled on needles or other bearing means 56', the pin 55' being snugly fitted into bores formed in the extremities of arms 59' and 60' of the link construction 58', the arms 59' and 60' having their inner ends connected to suitable shock absorbing means, preferably hydraulic, as illustrated at 61'. The arms 59' and 60' are held in assembled relationship by means of bolts 64'. It will thus be seen that the rear or drive wheels of the vehicle are supported in the same manner as the front wheels of the vehicle and have the same independent action for each wheel.

In order to effect a virtual shifting of the support of the spring so as to obtain stiffened action under extreme upward flexure of the spring leaves as described in connection with the front wheels of the vehicle, the differential casing is preferably formed with an extended portion 110 which may be curved as illustrated to effect a shifting of the support for the springs as they are flexed upwardly in the same manner that the cross-member 21 heretofore described is curved at 28 to obtain such a result. It is to be understood that this result may be obtained by any relative curvature existing between the upper leaf of a spring assembly and the supporting means as to both front and rear spring mountings. For example, the upper leaf of a spring assembly may be curved and the support made substantially horizontal without curvature, or both the support and an upper leaf may be curved slightly to obtain this desired result without departing from the spirit and scope of this invention.

It is to be noted that in the spring assembly the bolts 42 passing through the several leaves of the spring hold the leaves together by means of nuts 42'. The seat portions 23 of cross member 21 have enlarged openings 31 particularly shown in Figures 2 and 5 to accommodate the nuts 42'. These openings are made sufficiently large that in assembling the arrangement in order to have equal caster angles for the king pins or shaft 74, it is only necessary to loosen the spring clamps 29 and move the spring assemblies transversely until the caster angles of the king pins are substantially identical after which the spring clamps 29 may be drawn up by means of bolts 30 into clamping position.

The transmission of power to the drive wheels is obtained through my invention in a simple and efficient manner. Referring particularly to Figures 6 and 9 through 12, inclusive, the frame structure 11 is provided with cross-members 13, 14, cross-member 13 being preferably formed with a central arcuate raised portion 114 suitably adapted to receive a bracket 115 which is vulcanized or otherwise secured to a block of rubber or other suitable resilient or yieldable material 116, the latter being in turn vulcanized or secured to a similarly curved bracket 117. Bracket 115, in the embodiment illustrated, is secured to the frame cross-member by means of bolts 118 or other suitable means while bracket 117 is secured to the exterior wall of a projection 120 formed on the differential housing 100 by means of bolts 121 passing through openings in bosses 122 formed on the housing extension 120. Bracket 115 may be positioned with respect to the frame member 13 by means of a threaded member 123 and a nut 124 while bracket 117 may be centered with respect to projection 120 by means of a threaded stud 125.

The cross-member 14 arranged at the rear of the differential casing 100 supports a bracket 127 which in turn is vulcanized or otherwise secured to a rubber block or other resilient element 128 which has its inner wall 129 preferably of arcuate curvature vulcanized to or otherwise cooperatively associated with a projection 130, in the embodiment illustrated this projection being formed integrally with the differential casing 100. It is herein pointed out that the rubber blocks 116 and 128 form a resilient mounting between the differential housing and the frame of the vehicle and is adapted to withstand and absorb shocks which may be transmitted by the drive wheels to this portion of the mechanism by permitting a limited movement of the differential housing with respect to the frame and at the same time gear noises or resonance as well as engine vibrations are prevented from being transmitted to the vehicle frame by reason of this yieldable mounting. Transverse road shocks are also cushioned from the frame. The propeller or main drive shaft 149 is connected to the gear set and prime mover (not shown) of the vehicle in the usual manner. The frame cross member 13 has an opening 133 of a larger diameter than the diameter of the propeller shaft 149 and the wall of frame 14 has an opening 134 of larger diameter than that of a projection 135 extending therethrough, the projection 135 being secured to or forming a part of the housing 100. The purpose of this arrangement is to positively limit the yieldable movement of the differential housing which is mounted on rubber blocks 116 and 128 and have the safety factor that should either or both of the rubber blocks be dislodged, the housing would only move to the extent as limited by the walls of the openings 133 and 134 engaging the exterior surfaces of propeller shaft 149 and the pin 135.

The housing extension 120 houses and encloses suitable bearings 136 supporting a driving pinion 137 and shaft 139 which in assembled relationship meshes with a ring or driven gear 138. The ring gear is fixed to a member 140 which encloses differential gear mechanism, one of such gears being shown at 141 in Figure 6, member 140 having elongated portions 142 to accommodate the inner race 144 of a roller bearing. The outer race 145 of the bearing snugly fits an interior bore formed in a boss 146 as part of the housing 100. The outer race 145 of the bearing is held in contact with the bearing rollers 147 by means of a ring or annulus 148 threadedly engaging the bore within which is positioned the race 145. Extending centrally through the ring 138 is a stub shaft 150 having a splined end 151 received in the correspondingly splined inner bore in gear 141 the splines being of a slidable fit. The outer extremity of the shaft 150 is formed with one portion of a universal joint 152 which is coupled with the other half 153 of the joint carried by a drive shaft 154, the latter terminating in a flange portion 155 which in turn is coupled with a flange member 156 carrying a portion 157 of a second universal joint, the latter in turn being coupled with the other half 158 of the joint which, as illustrated, is integrally formed with a spindle portion 159 which is secured to and serves to drive the vehicle wheel preferably through feather and spline connection 143 as shown in Figure 6. The arm or member 37' is also formed with a projecting sleeve-like portion 161 upon which the wheel is journalled by means of suitable bearings 162, 163. The shaft 159 is preferably journalled in the extension 161 by anti-friction bearings as, for example, needle bearings 164.

In effecting a drive to the rear wheels, the drive pinion shaft 139 is coupled with a suitable prime mover (not shown) through propeller shaft 149, and rotation of the propeller shaft actuates the driving pinion 137 and ring gear 138 and differential gear mechanism 141. Power is transmitted to the stub shaft 150 and in turn through the universal joints and drive shaft 154 and connection 143, a drive is established to the wheel 160. It will be apparent that the vehicle wheel may move in a substantially vertical direction by reason of the spring suspension hereinbefore explained and that the driving of the rear wheels is substantially unaffected by such vertical movement by reason of the universal and drive shaft arrangement as above described. It is to be further noted that the shaft 150 is splined for slidable movement in the gear 141 so that any longitudinal movement of shaft 154 caused by reason of vertical movement of the vehicle wheel will occur within the differential housing 100 wherein the parts are at all times lubricated and the housing effectively sealed by means of felt rings 166. The upper part of the differential housing is closed by suitable cover 167 which may be of sheet metal or other suitable material.

I have also provided an arrangement and method of a unitary assembly for the differential gearing and ring gear power transmission mechanism in the housing 100, wherein the construction is rendered extremely strong and the assembly greatly simplified. This arrangement and method of assembly is illustrated in Figure 12. The particular wheel driving or actuating mechanism hereinbefore described and spring suspension eliminating the conventional axles, facilitates the assembly of the differential and ring gear mechanism as an integral unit, as illustrated in dotted lines in Figure 12, the upper portion of the differential housing being notched as at 170 to accommodate the entrance of bearing projections 142 and bearing race 144. In the manner illustrated, the differential and ring gear assembly may be inserted angularly with respect to the axis of the bearing openings in housing 100 until one of the projections 142 enters one opening in the housing, after which the other end of the assembly may be moved into place through one of the notches 170 and the bearing rollers 147 and the outer race 145 assembled from the exterior of the housing 100. The bearing retaining rings 148 may then be threaded into bearing retaining position, as shown in Figure 6, and the driving stub shafts 150 may afterwards be inserted from the exterior of the housing to slidably engage the splines 151 thereof in differential gears 141. By this means, all removable bearing caps and the like or split bearings are eliminated and the differential assembly rigidly held in permanent fixed relation within the differential housing. After this assembly has been completed the cover plate 167 may be affixed to enclose the upper opening in the differential housing.

I have provided means for stabilizing or checking to a large extent "side-sway" or the tendency of the chassis and body of the vehicle to tilt laterally when the vehicle is rounding a curve at a comparatively high speed. This means is inclusive of a torque rod or checking member 175 as illustrated in Figures 1, 6 and 7, extending transversely of the vehicle frame or chassis and journalled in suitable brackets 176 welded or otherwise secured to the side members 11 of the vehicle frame construction. The rod 175 preferably extends beyond the brackets 176 and receives at its extremities arms 177 secured in any suitable manner to rod 175 as by means of pins 178 or suitable spline connection. The axis of the rod 175, as illustrated, is preferably out of vertical alignment with the link construction 59', 60' as shown in Figure 7, the ends of the arms 177 terminating at points substantially beneath the central axis of link construction 58'. The extremity of each arm is preferably bifurcated as shown at 180 and accommodates a pin 181 having a head portion 182 being held in place by means of a threaded nut 183. Interposed in the yoke of the extremity of the arm 177 is a connecting link 185 through which pin 181 passes, there being preferably interposed between the pin 181 and the walls of the opening and of link 185 a bushing 179 of suitable material, for example rubber, or other compressible or resilient material, which automatically compensates for slight misalignment of parts which may arise during manufacture and also tends to eliminate noises arising from relative movement of these parts. The upper end of link 185 is bored on an axis substantially at right angles to the bore through which pin 181 extends and a bushing of rubber or suitable material 187 is interposed in the bore in the upper portion of said link.

The component arms 59' and 60' of link 58' are formed intermediate their ends with embossed portions 190 and 191 which are bored to receive a pin or shaft 192, the upper portion of link 185 extending between the embossed portions 190 and 191 of the links, the pin 192 passing through aligned bores in the bosses 190 and 191 and through the bushing 187 carried in the upper portion of link 185. The shaft or pin 192 is preferably threaded at each end to receive retaining nuts 195 to hold the pin in proper position. It may be desirable to interpose washers 196 between the bosses 190 and 191 at the ends of the upper portion of link 185 which washers may be of soft material as, for example, rubber or compressible material for the purpose of absorbing thrusts and deadening any noises which may arise from movement of the parts.

It is to be understood that the torque rod or stabilizer 175 connects both sets of links 58' located at either side of the vehicle, as particularly shown in Figure 1 and while I have shown this arrangement as applied to the rear of the vehicle, it is to be understood it may be incorporated in the front or non-drive wheel suspension of the vehicle or at both places if so desired. The function of this arrangement above described is to substantially eliminate or reduce the "side-sway" of the vehicle during the operation of the vehicle in rounding a curve at high speeds. The vehicle chassis if not restrained would tilt laterally around the longitudinal axis of the vehicle. In the present construction the tilting or side-sway is restrained because if the vehicle begins to tilt laterally the shock absorber links being connected by means of arm 177 to the rod 175, the latter tends to resist such tilting causing a twist or torque in the rod 175 which opposes the lateral tilting movement of the frame and in this way the frame is prevented from tilting a distance greater than will be allowed by reason of the extent of torque or twist set up in the rod 175. Under normal operation of the vehicle on comparatively straight roads the vehicle wheels are permitted to move in vertical direction and through the links 185 and arms 177 a slight twisting of the rod 175 is encountered but such torque is not sufficient to interfere materially with the riding qualities of the vehicle.

It is apparent that, within the scope of the invention modifications and different arrangements may be made other than is herein disclosed, and the present disclosure is illustrative merely, the invention comprehending all variations thereof.

What I claim is:

1. A spring suspension for automotive vehicles comprising in combination, a vehicle frame; a differential housing enclosing power transmission mechanism; curved extensions carried by said housing; a yieldable mounting between said differential housing and said frame; a spring secured to said housing and adapted to contact with said curved extensions to change the effective support of said spring; a wheel supporting member connected to said spring; a vehicle wheel journalled on said supporting member; and means associated with said wheel supporting member and said frame whereby the vehicle wheel is maintained substantially vertical during flexures of said spring.

2. A vehicle suspension system comprising in combination, a vehicle frame; a differential housing resiliently supported centrally of the frame; a leaf spring assembly secured to said housing and projecting transversely of the vehicle and including a pair of spaced leaf springs; a wheel supporting means having a journal connection with the spring assembly; a vehicle wheel carried by said supporting means; a hydraulic shock absorber carried by said frame; a link connection between said wheel supporting means and said shock absorber; a driving shaft connecting said vehicle wheel with said differential mechanism located above and lying in a vertical plane passing between the spaced leaf springs; and universal joints interposed in said driving connection whereby said wheel and supporting means may move substantially vertically during flexures of said spring assembly.

3. A vehicle suspension system comprising in combination, a vehicle frame; a differential housing; a rubber mounting interposed between said housing and said frame; a pair of spaced leaf springs secured to said housing and projecting transversely of the vehicle; a wheel supporting means having anti-friction bearing connections with said springs; a hydraulic shock absorber carried by said frame; a link connection between said wheel supporting means and said shock absorber mechanism; anti-friction bearings arranged between said link and wheel supporting means; a driving shaft for said vehicle wheel located in a vertical plane passing between the spaced leaf springs; and universal joints connecting said shaft with said vehicle wheel and said differential mechanism.

4. In a suspension system for vehicle wheels, the combination of a frame; a pair of leaf springs mounted upon said frame transversely thereof; a member connected to one extremity of said springs; a link connected to said member and with the frame; a wheel supporting spindle; journal connections between said member and wheel supporting spindle including a shaft; a journal connection between said member and said link; washers interposed between said member and link connection whereby the thickness of washers interposed in said connection determines the inclination of said shaft.

5. A system for the suspension of automotive vehicles comprising, in combination, a vehicle frame; a spring secured to the frame and projecting transversely of the vehicle; wheel supporting spindles located adjacent to the ends of said spring; a connection between each end of said spring and each spindle; shock absorbers associated with said vehicle frame, each located adjacent to the end of said spring; a link connecting each shock absorber with each spindle; and a torque member extending in parallel relationship to said spring and having its ends positively connected to each link.

6. A vehicle suspension system comprising, in combination, a vehicle frame; a differential housing resiliently supported centrally of the frame; a leaf spring assembly secured to said housing and projecting transversely of the vehicle, said assembly including a pair of spaced leaf springs; wheel supporting means having a journal connection with the spring assembly; a vehicle wheel carried by said supporting means; a shock absorber carried by said frame; a link connecting said wheel supporting means and said shock absorber; a driving shaft connecting said vehicle wheel with the differential mechanism and located above and lying in a vertical plane passing between the spaced leaf springs; and means interposed in said driving connection whereby said wheel and its supporting means move substantially vertically during flexures of said spring assembly.

7. In combination, a supporting member formed of sheet metal and having a depending U-shaped portion; leaf spring assemblies mounted upon said supporting member on each side of said depending U-shaped portion, said supporting member having portions of arcuate configuration adjacent to the normal points of engagement of said spring assemblies to said supporting member for changing the effective supporting points of said spring assemblies during flexures thereof; and means for securing said spring assemblies to said supporting member and for retaining said spring assemblies in engagement with the depending U-shaped portion of said support.

8. A spring suspension system for automotive vehicles comprising, in combination, a vehicle frame; a differential housing; a rubber mounting positioned between said differential housing and said frame; a spring secured to said differential housing extending transversely of the vehicle; vehicle wheel supporting members connected respectively to the ends of said spring; a pair of links, each associated with a wheel supporting member and said frame whereby the vehicle wheels are maintained substantially vertical during flexures of said spring; and a torque rod journalled in said frame and having its ends connected respectively to said links intermediate the ends of said links.

KARL K. PROBST.

CERTIFICATE OF CORRECTION.

Patent No. 2,157,773.   May 9, 1939.

KARL K. PROBST.

It is hereby certified that error appears in the printed specification of the above numbered patent requiring correction as follows: Page 4, second column, line 58, for "ring 138" read ring 148; and that the said Letters Patent should be read with this correction therein that the same may conform to the record of the case in the Patent Office.

Signed and sealed this 20th day of June, A. D. 1939.

(Seal)
Henry Van Arsdale
Acting Commissioner of Patents.